(12) United States Patent
Min

(10) Patent No.: US 11,724,661 B2
(45) Date of Patent: Aug. 15, 2023

(54) SEAT AIRBAG DEVICE FOR VEHICLE

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/894,339

(22) Filed: Aug. 24, 2022

(65) Prior Publication Data

US 2023/0065150 A1  Mar. 2, 2023

(30) Foreign Application Priority Data

Aug. 27, 2021 (KR) .......................... 10-2021-0113931

(51) Int. Cl.
| | |
|---|---|
| *B60R 21/233* | (2006.01) |
| *B60R 21/207* | (2006.01) |
| *B60R 21/2338* | (2011.01) |
| *B60R 21/231* | (2011.01) |

(52) U.S. Cl.
CPC .......... *B60R 21/233* (2013.01); *B60R 21/207* (2013.01); *B60R 21/2338* (2013.01); *B60R 21/23138* (2013.01); *B60R 2021/23146* (2013.01); *B60R 2021/23386* (2013.01)

(58) Field of Classification Search
None
See application file for complete search history.

(56) References Cited

U.S. PATENT DOCUMENTS

| | | | | |
|---|---|---|---|---|
| 9,573,553 | B2 * | 2/2017 | Ko | B60R 21/13 |
| 10,850,699 | B2 * | 12/2020 | Dry | B60R 21/207 |
| 11,084,447 | B2 * | 8/2021 | Rupp | B60R 21/231 |
| 11,091,115 | B2 * | 8/2021 | Saso | B60R 21/21 |
| 11,338,759 | B2 * | 5/2022 | Nakajima | B60R 21/233 |
| 11,383,667 | B1 * | 7/2022 | Kadam | B60R 21/207 |
| 2019/0016293 | A1 * | 1/2019 | Saso | B60R 21/264 |
| 2021/0001799 | A1 * | 1/2021 | Sandinge | B60R 21/2338 |
| 2021/0061211 | A1 * | 3/2021 | Jung | B60R 21/2338 |
| 2022/0379833 | A1 * | 12/2022 | Shimizu | B60R 21/23138 |
| 2022/0388472 | A1 * | 12/2022 | Hwangbo | B60R 21/2338 |

FOREIGN PATENT DOCUMENTS

| | | | | |
|---|---|---|---|---|
| KR | 102209220 | B1 * | 1/2021 | |
| KR | 20210058424 | A * | 5/2021 | |
| KR | 20210059986 | A * | 5/2021 | |
| KR | 10-2021-0070413 | A | 6/2021 | |
| KR | 20220164314 | A * | 12/2022 | |
| WO | WO-2021065304 | A1 * | 4/2021 | |

\* cited by examiner

*Primary Examiner* — Faye M Fleming
(74) *Attorney, Agent, or Firm* — NovoTechIP International PLLC

(57) ABSTRACT

A seat airbag device for a vehicle is proposed. The seat airbag device includes an airbag cushion including a side chamber deployed forward from a seatback of the vehicle and located at a lateral surface of a passenger and a front chamber deployed from an upper portion of the seatback and arranged to be extended forward of the passenger and to wrap the upper side and front side of the passenger, and a support tether extended from the seatback and connected to the airbag cushion so as to support the airbag cushion.

16 Claims, 5 Drawing Sheets

SEAT AIRBAG DEVICE FOR VEHICLE

CROSS-REFERENCE TO RELATED APPLICATIONS

The present application claims the benefit of priority to Korean Patent Application No. 10-2021-0113931, filed Aug. 27, 2021, the disclosure of which is incorporated herein by reference in its entirety.

TECHNICAL FIELD

The present invention relates to a seat airbag device mounted to a seat of a vehicle and configured to cover and protect a passenger.

BACKGROUND

An airbag is a device provided to protect a passenger from an impact generated when a vehicle collides, and includes an airbag cushion that is rapidly filled with air to protect the passenger in the event of an accident. Since the development of airbags in the 1950s, the airbag technology advanced in order of the first-generation airbag that simply explodes, the second-generation airbag that minimizes injuries to passengers by reducing the deployment pressure of the airbag, and the third-generation airbag that explodes after determining the impact strength and adjusting the pressure. Currently, the fourth-generation airbag with a function of appropriately inflating by determining passenger's position, physique, posture, and degree of collision by themselves are being commercialized and produced.

The development of autonomous vehicles that can operate autonomously without driver intervention is also being actively developed. In line with the era of autonomous vehicles, airbags that keep the safety of passengers are changing into various forms. With the development of autonomous driving technology, as the driver's intervention in the vehicle, such as steering or braking, etc. is reduced, it is expected that consumers' demand for safety devices will increase.

Specifically, as an automobile evolves from a simple means of transportation to a living space, seating arrangement and riding posture are expected to change, so the shape of the airbag device is also expected to change. Currently, the seat arrangement faces forward, but in the future, it is expected that the seat arrangement will be able to be freely arranged, such as the seat arrangement in which seats face each other or are adjusted independently. Therefore, in consideration of a seat form of the autonomous vehicle, development of a deployed-from-seat airbag that wraps the passenger's body from the opposite lateral sides of the seat is being developed, rather than the current airbag form.

However, the conventionally developed airbag has a shape deployed around the passenger's upper body, and there is a problem in that the front part of the passenger's upper body cannot be protected in an event of an impact. Furthermore, there is a problem in that it is impossible to prevent injuries to the passenger due to the sub-marine effect in an even of an accident. Therefore, there is a need to solve these problems.

The foregoing is intended merely to aid in the understanding of the background of the present invention, and is not intended to mean that the present invention falls within the purview of the related art that is already known to those skilled in the art.

SUMMARY

The present invention has been made keeping in mind the above problems occurring in the related art, and the present invention is intended to provide a seat airbag device of which an airbag cushion is deployed from a lateral surface and an upper portion of a seat of a vehicle to secure the passenger and to protect a passenger from an external impact.

In order to achieve the above objective, according to one aspect of the present invention, there is provided a seat airbag device for a vehicle, the seat airbag device including: an airbag cushion including a side chamber deployed forward from a seatback of the vehicle and located at a lateral surface of a passenger and a front chamber deployed from an upper portion of the seatback and arranged to be extended forward of the passenger and to wrap the upper side and front side of the passenger; and a support tether extended from the seatback and connected to the airbag cushion so as to support the airbag cushion.

The seat airbag device may include: an inflator connected to the airbag cushion and configured to inject gas into the airbag cushion to deploy the airbag cushion.

The inflator may be connected to the side chamber and be configured to inject gas into the side chamber, and the side chamber may communicate with the front chamber.

An upper portion of the side chamber may communicate with an upper portion of the front chamber, such that the gas may be injected from the inflator into the side chamber and then the gas may be injected into the front chamber.

The support tether may be extended from the seatback to wrap the side chamber and be connected to an end of the front chamber.

The support tether may be extended from the upper portion of the seatback to be connected to the end of the front chamber.

The support tether may be extended from the upper portion of the seatback and be connected to an end of the front chamber, and the support tether may include an auxiliary tether extended from a lateral surface of the seatback and connected to the support tether.

An end of the auxiliary tether may be connected to an end of the support tether.

An end of the auxiliary tether may be connected to a middle portion of the support tether.

Both a pair of side chambers and a pair of support tethers may be arranged at opposite lateral surfaces of the passenger.

According to the present invention, the seat airbag device for a vehicle can protect the front portion and the opposite lateral portions of the passenger with the side chamber, which is deployed at the lateral surface of the passenger when the passenger sits in the seat, and the front chamber, which is deployed by being extended upward from the upper portion of the passenger, and as the upper portion of the side chamber communicates with the front chamber, the front chamber is deployed forward from the upper portion of the passenger after the side chamber is unfolded, so that there is an effect of protecting the passenger.

Furthermore, the seat airbag device includes the support tether extended from the seatback and connected to the front chamber so as to support the front chamber and the side chamber and the auxiliary tether extended from the seatback and connected to the support tether, so that there is an effect of securing the passenger inside the airbag cushion.

DETAILED DESCRIPTION

Figure 1:
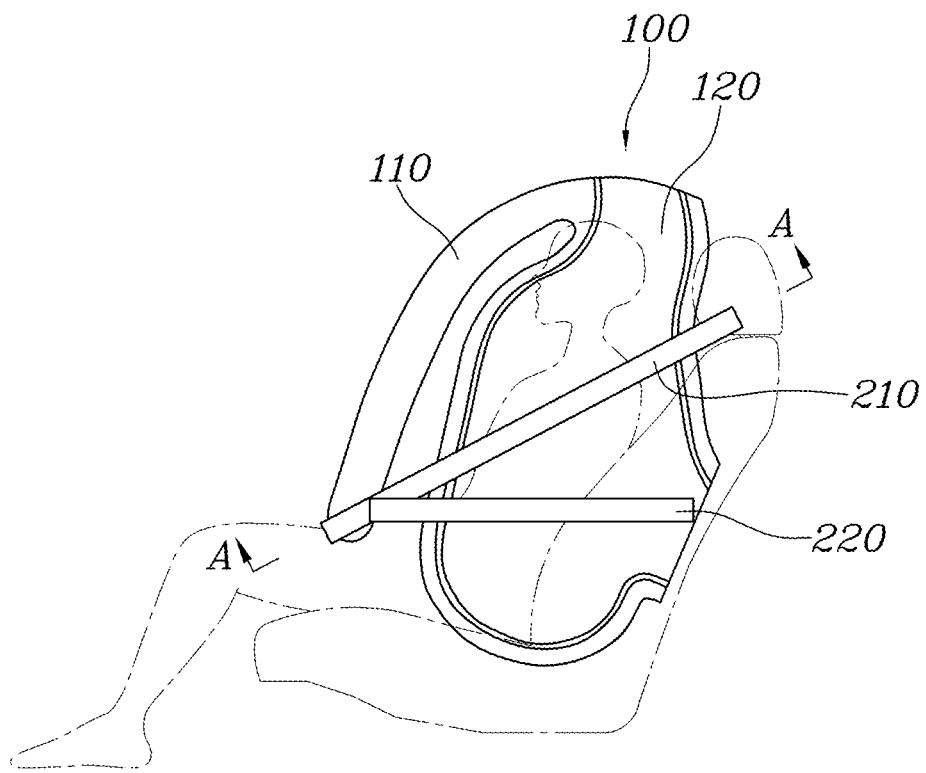
FIG. 1 is a side view showing a seat airbag device for a vehicle according to a first embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, an exemplary embodiment of the present invention will be described in detail with reference to accompanying drawings.

A seat airbag device for a vehicle according to the present invention is developed such that a direction of a seat on which a passenger sits and a reclining angle of a seatback variously change, as vehicles gradually changes towards autonomous vehicles. Therefore, a sitting direction and a sitting posture of the passenger are variously located, and herein, when an even of a vehicle collision occurs, there is a need to protect the passenger in all directions.

Accordingly, the seat airbag device for a vehicle according to the present invention includes an airbag cushion 100 that is deployed from the seat and configured to protect the passenger in all directions.

Figure 2:
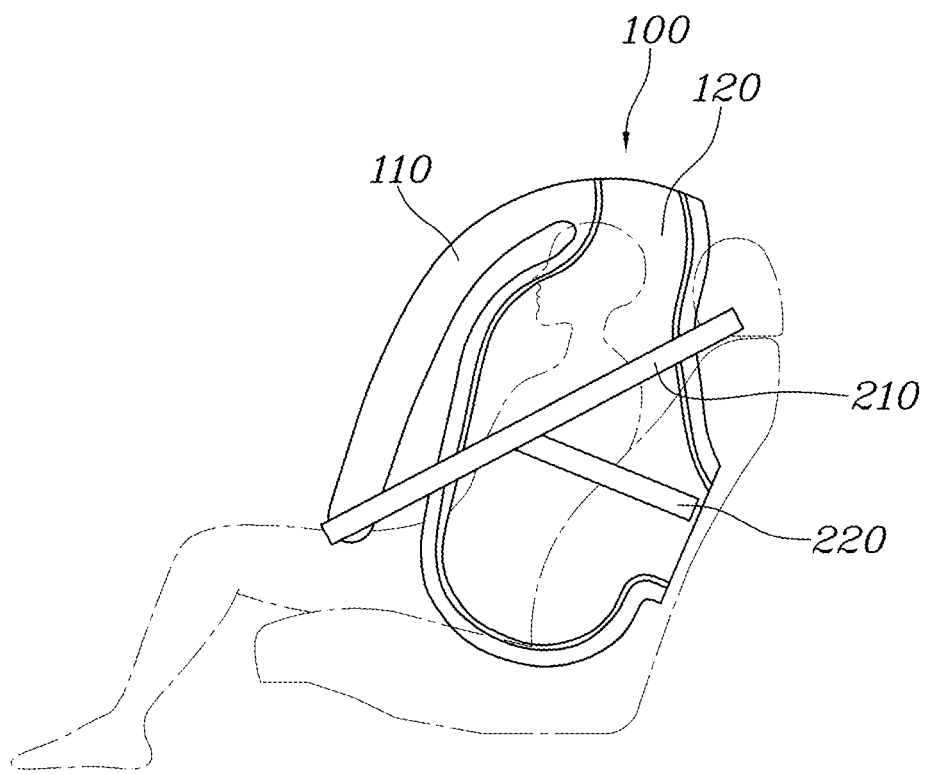
FIG. 2 is a side view showing the seat airbag device for a vehicle according to a second embodiment of the present invention.
Figure 3:
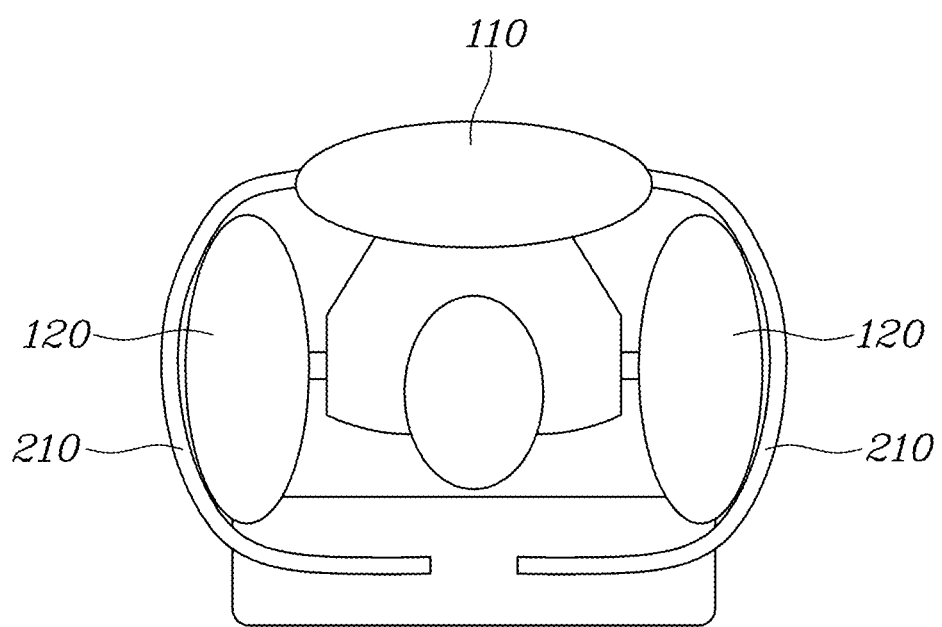
FIG. 3 is a sectional view taken along line A-A in FIG. 1.
Figure 4:
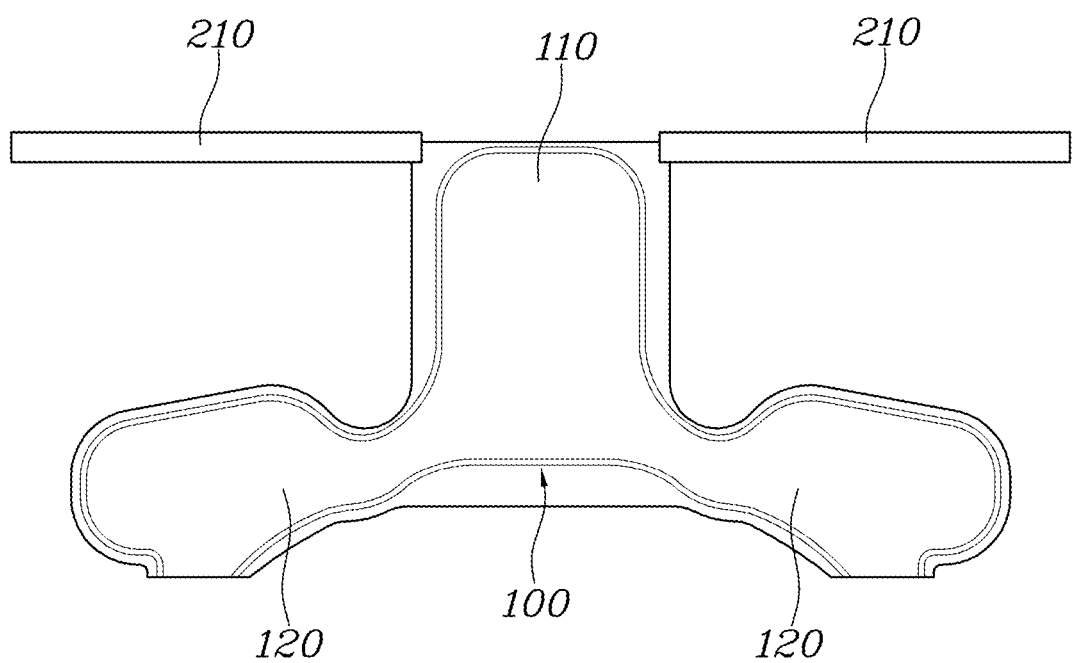
FIGS. 4 to 5 are planar views showing the seat airbag device for a vehicle before being assembled according to various embodiments of the present invention.
Figure 5:
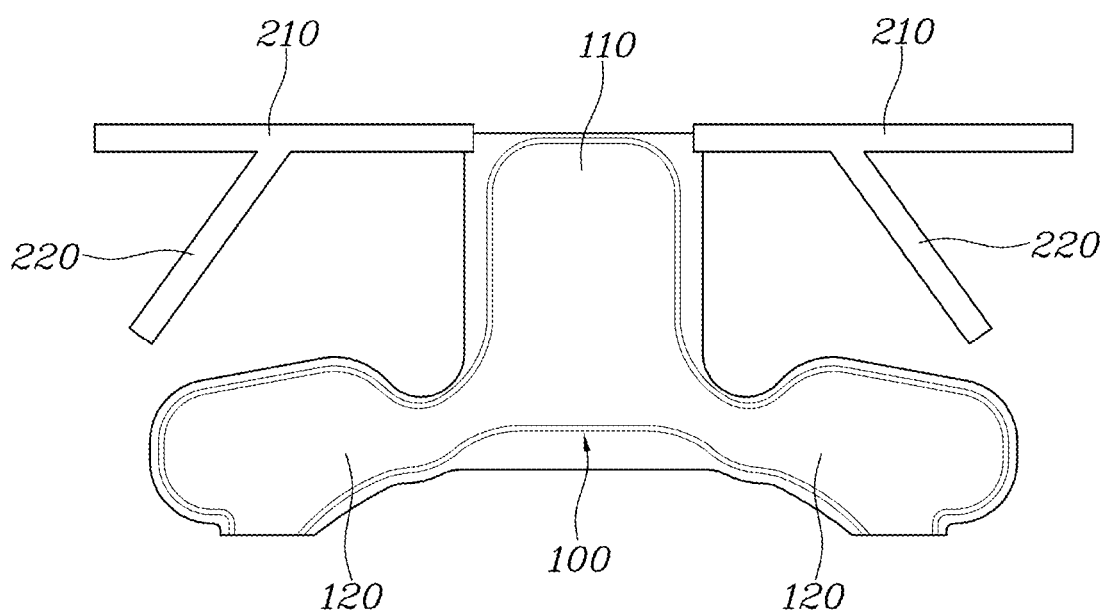

FIG. 1 is a side view showing a seat airbag device for a vehicle according to a first embodiment of the present invention. FIG. 2 is a side view showing the seat airbag device for a vehicle according to a second embodiment of the present invention. FIG. 3 is a sectional view taken along line A-A in FIG. 1. FIGS. 4 to 5 are planar views showing the seat airbag device for a vehicle before being assembled according to various embodiments of the present invention.

Exemplary embodiments of the seat airbag device for a vehicle according to the present invention will be described with reference to FIGS. 1 to 5.

According to the present invention, the seat airbag device for a vehicle includes: an airbag cushion 100 including a side chamber 120 deployed forward from a seatback of the vehicle and located at and cover a lateral side of a passenger and a front chamber 110 deployed from an upper portion of the seatback to a front of the passenger and to cover or wrap the upper side and the front side of the passenger; and a support tether 210 extended from the seatback and connected to the airbag cushion 100 to support the airbag cushion 100.

The airbag cushion 100 is mounted to the seatback while being folded, and in an even of a vehicle collision, the airbag cushion 100 may be deployed by receiving a collision signal from a collision detection sensor.

The airbag cushion 100 may consist of the side chamber 120 deployed forward from a lateral surface of the seatback and located beside the passenger and the front chamber 110 extended forward of the passenger from the upper side of the seatback and wrapping the upper side and the front side of the passenger.

Therefore, when the passenger sits on the seat, the airbag cushion 100 protects all the front, upper, and lateral portions of the passenger, and even when the seat rotates any angle or the seatback rotates into a relax mode to allow the passenger to lay, the airbag cushion 100 has an effect of protecting the passenger.

Furthermore, the support tether 210 extended from the seatback to be connected to the airbag cushion 100 supports the airbag cushion 100, so that it is possible to support a front surface of the front chamber 110 leaning forward or the side chamber 120 leaning sideways.

Therefore, the passenger can be protected from an impact due to an external collision while being secured inside the airbag cushion 100, and furthermore, the passenger can be protected from being injured due to a collision with interior components of the vehicle or other passengers in the vehicle.

The seat airbag device may include an inflator (not shown) connected to the airbag cushion 100 and injecting gas into the airbag cushion 100 to deploy the airbag cushion 100.

The inflator (not shown) may be provided in the seatback and be connected to a collision sensor of the vehicle to receive a collision signal. When the collision sensor transmits the signal, the inflator injects gas, which is generated by the explosion of gunpowder therein, into the airbag cushion 100 to quickly deploy the airbag cushion 100 folded and mounted to the seatback to quickly protect the passenger.

The airbag cushion 100 may be cut at a cut portion in the state in which the airbag cushion 100 is mounted to the seatback by gas pressure of the gas injected from the inflator to be quickly located at the upper, front, and lateral portions of the passenger.

The inflator may be connected to the side chamber 120 to inject gas into the side chamber 120, and the side chamber 120 may be connected to and communicate with the front chamber 110.

The inflator provided in the seatback may be connected to the side chamber 120 of the airbag cushion 100 and inject gas into the side chamber 120 to deploy the side chamber 120 preferentially. The side chamber 120 may be connected to the front chamber 110 to communicate with the front chamber 110 and the gas injected into the side chamber 120 may be injected into the front chamber 110 and thus the side chamber 120 may be deployed and then the front chamber 110 may be deployed sequentially.

Assuming that a vehicle seat is arranged to face the front, in addition to the seat airbag device for a vehicle mounted to the seat, a driver's seat and a front passenger's seat may respectively include a driver's airbag and a front passenger's airbag that may be deployed in front of each seat. Therefore, in order to protect the lateral portion of the passenger preferentially, the side chamber 120 of the seat airbag device for a vehicle may be deployed preferentially to protect the lateral portion of the passenger, and then the front chamber 110 communicating with the side chamber 120 may be deployed to protect the upper and front portions of the passenger and to secure the passenger to the seat.

Accordingly, the seat airbag device can safely protect the passenger even in an event of a side collision.

A pair of side chambers 120 and a pair of support tethers 210 may be arranged at the opposite sides of the passenger.

The side chamber 120 deployed forward from a lateral surface of the seatback is provided as the pair of side chambers 120 deployed at the opposite surfaces of the seatback, and protects the opposite lateral sides of the passenger. Therefore, it is possible to prevent the passenger from being damaged even not only in an impact generated when a collision occurs at a door of the vehicle, but also in injuries to the passenger colliding with interior parts of the vehicle due to an external impact.

Furthermore, even when a direction of rotation of the vehicle is not predicted as in a situation in which the seat of the vehicle rotates so that the passenger faces various directions, the side chamber 120 has an effect of protecting the opposite lateral sides of the passenger.

An upper portion of the side chamber 120 communicates with an upper portion of the front chamber 110, so that after the gas is injected from the inflator, the gas may be injected into the front chamber 110.

As shown in FIGS. 4 and 5, the upper portion of the side chamber 120 is connected to the front chamber 110 so as to communicate with the front chamber 110, so that the gas injected into the side chamber 120 flows through a portion where the upper portion of the side chamber 120 communicates with the front chamber 110 and is injected into the front chamber 110, and the front chamber 110 may be deployed from an upper surface to a front surface of the front chamber 110.

Therefore, the front chamber 110 may be deployed while being extended from the upper surface to the front surface thereof, and thus the front chamber has an effect of protecting the upper portion to the front portion of the passenger at the same time.

The support tether 210 may be extended from the lateral surface of the seatback to wrap the side chamber 120 and to be connected to an end (e.g., a lower end portion) of the front chamber 110.

As an embodiment of the support tether 210, a first end of the support tether 210 may be connected to the lateral surface of the seatback and wrap the side chamber 120 and a second end of the support tether 210 may be connected to the front chamber 110.

Therefore, the support tether 210 prevents the side chamber 120 from spreading from each other so as to prevent the passenger from leaning from the left to the right, and prevents the passenger from leaning forward due to the front chamber 110 moving forward, so that the support tether 210 has an effect of securing the passenger inside the airbag cushion 100.

Furthermore, since the support tether 210 is composed of one tether, manufacturing costs of the airbag device can be reduced.

As another embodiment of the support tether 210, the support tether 210 may be extended from the upper portion of the seatback and be connected to the end of the front chamber 110.

As the first end of the support tether 210 is connected to an upper end of the seatback and the second end of the support tether 210 wraps the upper portion of the side chamber 120 to be connected to the end of the front chamber 110, the support tether 210 supports the upper portion of the side chamber 120 so as to support the head of the passenger shaking from the left to right, and the support tether 210 is connected to the end of the front chamber 110 so as to support the passenger leaning forward, thereby securing the passenger inside the airbag cushion 100.

The support tether 210 may be extended from the upper portion of the seatback and be connected to the end of the front chamber 110, and include an auxiliary tether 220 extended from the lateral surface of the seatback and connected to the support tether 210.

As another embodiment of the support tether 210, the first end of the support tether 210 may be connected to the upper portion of the seatback, and the second end of the support tether 210 may be connected to an end of a lateral surface of the front chamber 110 so as to secure the passenger leaning forward to protect the passenger and, at the same time, to support the upper portion of the side chamber 120.

Therefore, the support tether 210 prevents the passenger from leaning forward due to inertia of the vehicle and from being injured due to a collision with a front steering wheel or interior components with front surface of the front chamber 110 bent upward. Furthermore the support tether 210 may supports the upper portion of the side chamber 120 so as to prevent the head of the passenger from shaking transversally.

An end of the auxiliary tether 220 may be connected to an end of the support tether 210.

As an embodiment of the auxiliary tether 220, as shown in FIG. 1, a first end of the auxiliary tether 220 may be connected to the lateral surface of the seatback, and the second end of the auxiliary tether 220 may be connected to an end portion of the support tether 210.

Therefore, the auxiliary tether 220 may increase a support force of the support tether 210 supporting the front chamber 110 moving forward.

The auxiliary tether 220 may be connected to a middle portion of the support tether 210.

As another embodiment of the auxiliary tether 220, as shown in FIG. 2, the first end of the auxiliary tether 220 may be connected to the lateral surface of the seatback, and the second end of the auxiliary tether 220 may be connected to the middle portion of the support tether 210.

Therefore, the auxiliary tether 220 may be located at the side chamber 120 to support the side chamber 120 moving sideways, thereby preventing the passenger from leaning from the left to the right.

Although the preferred embodiments of the present invention have been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. A seat airbag device for a vehicle, comprising:
an airbag cushion comprising (1) a side chamber configured, when supplied with gas, to deploy forward from a seatback of the vehicle and cover a lateral side of a passenger area of a seat of the vehicle, and (2) a front chamber configured, when supplied with the gas, to deploy forward from an upper portion of the seatback to a front of the passenger area and cover an upper side and front side of the passenger area; and
a support tether extending from the seatback to the airbag cushion and configured to support the airbag cushion,
wherein the side chamber and the front chamber are connected to one another so that, when gas is supplied to one of the front chamber and the side chamber, the gas flows into the other one of the front chamber and the side chamber.

2. The seat airbag device of claim 1, further comprising an inflator connected to the airbag cushion and configured to inject the gas into the airbag cushion.

3. The seat airbag device of claim 2, wherein:
the inflator is connected to, and configured to inject the gas into, the side chamber, and
the side chamber is connected to the front chamber.

4. The seat airbag device of claim 3, wherein:
an upper portion of the side chamber is connected to an upper portion of the front chamber, and
the side chamber is configured to receive the gas injected into the front chamber.

5. The seat airbag device of claim 1, wherein the support tether is configured, when the airbag cushion is deployed, to wrap the side chamber and extend from the seatback to a lower end portion of the front chamber.

6. The seat airbag device of claim 5, wherein the support tether is configured, when the airbag cushion is deployed, to extend from the upper portion of the seatback to the lower end portion of the front chamber.

7. A seat airbag device for a vehicle, comprising:
an airbag cushion comprising (1) a side chamber configured, when supplied with gas, to deploy forward from a seatback of the vehicle and cover a lateral side of a passenger area of a seat of the vehicle, and (2) a front chamber configured, when supplied with the gas, to deploy forward from an upper portion of the seatback to a front of the passenger area and cover an upper side and front side of the passenger area; and
a support tether extending from the seatback to the airbag cushion and configured to support the airbag cushion,
wherein:
the support tether is configured, when the airbag cushion is deployed, to extend from the upper portion of the seatback to a lower end portion of the front chamber, and
the seat airbag device further comprises an auxiliary tether extending from a lateral surface of the seatback to the support tether.

8. The seat airbag device of claim 7, wherein an end portion of the auxiliary tether is connected to an end portion of the support tether.

9. The seat airbag device of claim 7, wherein an end portion of the auxiliary tether is connected to a middle portion of the support tether.

10. The seat airbag device of claim 1, wherein:
the side chamber comprises a pair of side chambers disposed at opposite lateral sides of the passenger area, and
the support tether comprises a pair of support tethers disposed at the opposite lateral sides of the passenger area.

11. The seat airbag device of claim 7, further comprising an inflator connected to the airbag cushion and configured to inject the gas into the airbag cushion.

12. The seat airbag device of claim 11, wherein:
the inflator is connected to, and configured to inject the gas into, the side chamber, and
the side chamber is connected to the front chamber.

13. The seat airbag device of claim 12, wherein:
an upper portion of the side chamber is connected to an upper portion of the front chamber, and
the side chamber is configured to receive the gas injected into the front chamber.

14. The seat airbag device of claim 7, wherein the support tether is configured, when the airbag cushion is deployed, to wrap the side chamber and extend from the seatback to a lower end portion of the front chamber.

15. The seat airbag device of claim 14, wherein the support tether is configured, when the airbag cushion is deployed, to extend from the upper portion of the seatback to the lower end portion of the front chamber.

16. The seat airbag device of claim 7, wherein the side chamber and the front chamber are connected to one another so that, when gas is supplied to one of the front chamber and the side chamber, the gas flows into the other one of the front chamber and the side chamber.

* * * * *